(12) United States Patent
Anderson et al.

(10) Patent No.: US 11,254,875 B2
(45) Date of Patent: Feb. 22, 2022

(54) COVERED CAVITY KILN PYROLYZER

(71) Applicants: Paul S. Anderson, Normal, IL (US);
Gary L. Gilmore, Luthersburg, PA (US)

(72) Inventors: Paul S. Anderson, Normal, IL (US);
Gary L. Gilmore, Luthersburg, PA (US)

( * ) Notice: Subject to any disclaimer, the term of this patent is extended or adjusted under 35 U.S.C. 154(b) by 0 days.

(21) Appl. No.: 16/912,225

(22) Filed: Jun. 25, 2020

(65) Prior Publication Data
US 2020/0407642 A1    Dec. 31, 2020

Related U.S. Application Data

(60) Provisional application No. 62/964,737, filed on Jan. 23, 2020, provisional application No. 62/921,631, filed on Jun. 27, 2019.

(51) Int. Cl.

| | |
|---|---|
| *C10B 1/10* | (2006.01) |
| *C10B 47/30* | (2006.01) |
| *C10B 35/00* | (2006.01) |
| *C10B 47/48* | (2006.01) |
| *C10B 57/12* | (2006.01) |
| *C10L 5/44* | (2006.01) |
| *C10B 3/02* | (2006.01) |
| *C10B 53/02* | (2006.01) |

(52) U.S. Cl.
CPC ............... *C10B 47/30* (2013.01); *C10B 1/10* (2013.01); *C10B 35/00* (2013.01); *C10B 47/48* (2013.01); *C10B 3/02* (2013.01); *C10B 53/02* (2013.01); *C10B 57/12* (2013.01); *C10L 5/447* (2013.01)

(58) Field of Classification Search
CPC .. C10B 1/06; C10B 1/10; C10B 47/06; C10B 47/30; C10B 47/48; C10B 53/02; C10B 49/02; C10B 49/04; C10B 49/08; C10B 49/12; C10L 5/447
See application file for complete search history.

(56) References Cited

U.S. PATENT DOCUMENTS

| | | | | |
|---|---|---|---|---|
| 184,963 | A * | 12/1876 | Harrison | C10B 1/10 201/33 |
| 5,258,101 | A * | 11/1993 | Breu | C10B 1/10 202/131 |
| 5,821,396 | A * | 10/1998 | Bouziane | C10B 53/07 585/241 |

(Continued)

*Primary Examiner* — Jonathan Luke Pilcher
(74) *Attorney, Agent, or Firm* — Singleton Law Firm, P.C.

(57) ABSTRACT

The invention presents a covered cavity kiln pyrolyzer with modulated means of rotation, to promote mixing and exposure of the biomass to heat, thereby allowing complete and efficient pyrolysis of biomass therein. The invention has a portal arrangement for simultaneous entry of fuel and air alongside the exit of emissions and flames to a separate hood structure. In addition to rotational modulation for mixing, the rotational capabilities of the kiln also permit the removal of processed charcoal when the portal is turned downward. The invention also has a system of internal prongs for mixing and sifting removal of char, as well as automated fuel delivery mechanisms and a system of openings to allow insertion of pipes and sensors into the kiln for monitoring and for additional delivery of reagents for better modulation and efficiency by a user during the pyrolyzation process.

17 Claims, 6 Drawing Sheets

(56) References Cited

U.S. PATENT DOCUMENTS 9,321,966 B2* 4/2016 Wang .................. C10L 5/447
2012/0085023 A1* 4/2012 Teal .................... C10L 9/083
　　　　　　　　　　　　　　　　　　　　　44/605

* cited by examiner

Clockwise rotation for G, H, and I

G  H  I

Counterclockwise rotation for J, K, and L

J  K  L

COVERED CAVITY KILN PYROLYZER

CROSS-REFERENCE TO RELATED APPLICATIONS

This application claims the benefit of U.S. Provisional Patent Application No. 62/964,737, filed Jan. 23, 2020, and U.S. Provisional Patent Application No. 62/921,631, filed Jun. 27, 2019, both of which are incorporated by reference herein in their entirety.

BACKGROUND OF THE INVENTION

The present invention relates to the production of charcoal and pyrolytic gases. Particularly, an improved apparatus and method allowing for increased quality control, ease of use, cleaner emissions, more efficient supply of energy, the use of a variety of biomass feedstocks, and affordability in a multitude of locations at mid-range scales while being beneficial for disposal of excessive biomass and for climate-care issues.

Charcoal, or char, production is an ancient industry based on a physical-chemical decomposition of organic matter (biomass) through the application of heat. In recent years, char production has assumed greater importance, due to increased interest and concern regarding global warming, climate change, and atmospheric $CO2$ concentration. Production and subsequent burning of char results in a "neutral" carbon cycle, while production of incombustible char renders the carbon cycle "negative." Negative carbon cycles are the opposite of fossil fuel burning, which is considered "carbon positive." Char production is generally the only natural process that yields multi-century long-term carbon negative implications that are irreversible if the char is mixed into soil as biochar.

Fixed carbon content, the remaining residue after expulsion of volatile matter, is generated through simultaneous carbonization and pyrolization of biomass. Char results from carbonization, while pyrolization facilitates thermal decomposition of biomass and the release of volatile gases. Presence of a flame in the processes is not required, merely heat, and can be carried out under varying degrees of oxic and anoxic conditions. Low oxygen and anoxic conditions are a key aspect in most charcoal-making methods and devices, as an overabundance of oxygen at or near a surface of generated char can lead to the combustion of the char itself. The balance of oxygen levels with biomass loads can present a risk of wasted energy and loss of generated char.

One issue with prior art devices is the viable economic production of charcoal in quantities between 100 kg per 10-hour operational day and up to 10,000 kg per operational day. This level of output would typically require between 0.5 tonnes and 50 tonnes of biomass input per operational day. There is a pressing need for a pyrolytic device in this range of biomass input that is both functional and efficient in production.

Other issues presented by prior art devices include: (i) inefficient heat production for pyrolysis causing an excessive access to oxygen, which consumes generated char and requires restriction or control of air flow; and (ii) how to have the biomass reasonably exposed to the desired levels of heat without the biomass or created charcoal insulating or isolating some of the biomass, which requires an improved level of exposure of the biomass to the heat. These two challenges often come into conflict with one another in attempts to achieve the respective outcomes, that is, increased restriction versus increased exposure.

There exist two main methods for production of charcoal in the area of anoxic pyrolysis. The first is stationary retort technology, in which biomass is in a mostly sealed container with external heat penetration mainly through conduction. Biomass and charcoal are both rather poor conductors of heat, so once charcoal is created by pyrolysis, it can inhibit further penetration of heat into the load of biomass.

Rotating retort technology, also known as heated-screws or augers, is the other established method of anoxic pyrolysis for increased load exposure to the heat of pyrolysis. The biomass is continually entering one end of the screw and is pyrolyzed as it moves to the exit at the opposite end, that is, with two openings. The rotation can also be by the outer cylinder with a stationary inner screw. Rotation is normally continual and in one direction but pauses and reversals could be accomplished. However, due to the continual nature of these devices, such reversals present their own risks in over-exposure, either due to the fixed direction of production, the use of textured wall linings within the device, or a combination thereof. These devices leave little room for user-manipulation or modulation during char production.

Another known method is the traditional production process, utilizing earth-covered mounds of biomass. The biomass is encapsulated under a covering of earth, creating an anoxic condition into which the heat rises from small fires at a lower outer edge of the mound. There is no provision for moving or mixing any of the biomass, leaving this method susceptible to the same issues of efficiency and modulation as many other prior art methods.

In the area of oxic pyrolysis, various methods exist in the art, all with specific limitations and issues. Although normally designed for the complete combustion down to an ash remainder, incinerators can be operated with less oxygen so that some amount of charcoal can be extracted. Substantial air flow is used in what is referred to as "air curtain" technology to produce high heat. Some agitation such as with movement on the floor grate area is also used to encourage the fragmentation of the created charcoal, allowing heat to reach the more central parts of thicker pieces of biomass. Incinerator technology has two openings; one opening for biomass entrance and escape of pyrolytic gases and heat and another opening for removal of the charcoal and ash.

Top-Lit Up Draft (TLUD) technology involves a biomass in a static position while the pyrolysis progresses gradually from the top to the bottom as controlled small amounts of air enter and move upward from the bottom of the container, such as a barrel or a metal cook stove. Increasing the flow of primary air can increase the limited combustion of the pyrolytic gases, thereby increasing the temperature to create more gases and create higher-temperature charcoal, which in turn contains less volatiles. One variation of this is the "rick" method, without a container, used by Jack Daniels Company to make charcoal, and also the "conservation burn" or "controlled burn" implemented by Kelpie Wilson. Extinguishing is crucial to avoid losing the created charcoal.

Flame-cap, or Open Cavity Kilns, is another known method. Vessel shapes for this method can include cones, pyramids, Kon Tiki, Moxham, troughs, and trench or pit kilns. A flame-cap or cavity kiln is constructed with no entry of air into the lower cavity of the device, unless by operator-controlled means. The biomass is exposed to pyrolytic heat from direct fire from the combustion of pyrolytic gases within and above the uppermost layers of the biomass. The necessary air enters by coming over the lip of the cavity, and the oxygen is consumed in the cap of flames. This prevents much of the oxygen from reaching the surface of the created hot charcoal. The carbonized biomass shrinks in size and is rather fragile and falls downward into the cavity, protected from exposure to oxygen. Additional biomass is added into the area of combustion of the gases, creating more charcoal that then covers and further protects the lower layers of charcoal. When the charcoal level is near the top of the kiln, no more biomass is added and pyrolysis continues until there are no more yellow/reddish flames, and small blueish flames of burning $CO_2$ are seen and some white ash is visible on the surface of the charcoal. At that time, the char-making operation ends either with quenching, by dumping out the charcoal, or by suffocation with an air-tight lid.

One common issue with flame-cap kilns occurs when the addition of biomass is too fast and it prevents sufficient heat from reaching the lower biomass, resulting in incomplete pyrolysis ranging from dried biomass to torrefied biomass or lower-temperature charcoal than desired. Users of these kilns frequently use long sticks or rods to stir or pry upward the biomass, bringing the insufficiently pyrolyzed biomass to the zone of full exposure to the higher and direct heat of the cap of flames. Because of likely spilling of hot materials, these kilns are not suitable for substantial physical movement to cause significant shifting or tumbling of the charcoal created and held in the cavity. Fuel input needs to be appropriately gradual and requires the presence and attention of the user. The dimensions have generally not been larger than 2 meter diameter and 1 meter depth, in part because emission control decreases as diameter increases. These flame-cap kilns also typically lack any form of gas collection or structural flame shielding.

Further, flame-cap kilns in the art generally lack a mechanism, other than a pivotal dumping, for removal of char once pyrolysis is complete, leading to the aforementioned operation of the kiln until it is full, after which the process is halted, the char collected, and the process begun anew. This requirement of strict 'batch' operation can severely impact the overall efficiency of char production where the available biomass is more than can be pyrolyzed by a single flame-cap kiln use; again removing any user modulation from the process.

Historically, prior art gasifiers, mainly down-draft and up-draft gasifiers, are designed to obtain the maximum energy output, including both pyrolysis and maximum char-gasification, leaving only ash behind. With the inclusion of design limitations, these gasifiers can leave substantial amounts of charcoal behind or to be extracted during continuous operations. Some of these gasifiers have the ability internally to poke or prod or push the biomass and/or charcoal to have greater exposure of the biomass to the heat for pyrolysis. However, gasifiers are subject to strict volume limitations, as well as relying on carefully controlled entrance of air for selective combustion to drive pyrolysis.

Prior art pyrolyzers and charcoal production methods present issues in the areas of operational requirements, efficiency, incomplete pyrolysis, temperature control, and biomass compatibility. The present invention attempts to remedy the shortcomings of prior art pyrolyzers by providing a covered cavity pyrolyzer with integrated tumble-mixing, rotational and oxic modulation, as well as efficient char removal during the production process.

BRIEF DESCRIPTION OF THE INVENTION

The present invention provides a covered cavity kiln, capable of controlling oxygen exposure and pyrolysis processes, as well as regulated rotational modulation to allow physical mixing of the contents and facilitate exposure of the biomass to the required heat of pyrolysis. The kiln also allows removal of generated char without complete interruption of pyrolysis.

Embodiments of the invention include a fire-resistant container of any shape or size that serves as a covered cavity kiln. The container is totally enclosed except for at least one portal through which air, fuel, charcoal, emissions and flames/heat enter and/or exit therefrom. The entire covered cavity kiln may be rotated around its longitudinal axis, being supported either at the axis by an axle with legs or underneath by supporting wheels on a rack or sled. Rotation may be used to facilitate the shifting or tumbling of the contents to cause fragmentation of charcoal and exposure of any insufficiently pyrolyzed contents to the heat of pyrolysis. This is accomplished without undue exposure of the operator to the heat of the unit. Partial rotation also serves to position the at least one portal in appropriate ways for fuel intake, to restrict air entrance, to align the exit of the emissions/heat, and for discharge of the char upon process completion.

In another embodiment of the invention, a grate, prongs, or flanges may be disposed over the at least one portal to selectively retain pyrolyzed biomass from exiting when the at least one portal is directed downwards. In other embodiments, the grate may comprise a solid door that could be used when only mixing is taking place and no discharge is desired.

A hood or collector, including chimneys or manifolds is configured above the kiln, as a separate structure unconnected to the rotatable container, and configured to gather and direct the movement of the flames and emissions from the kiln. Using natural or induced draft, this permits greater control and cleanliness of emissions and heat and their possible usage.

Pipes, rods, sensors or other objects can be inserted into the kiln at either end of the kiln. These can deliver accelerants, such as air with oxygen, or decelerants, such as inert gases or water, or chemical additives such as fertilizer to alter the pyrolytic process inside the kiln.

Other embodiments of the invention include shelves and bins and other ways to feed the fuel into the covered cavity kiln via the at least one portal arrangement. Also included are trays and ramps to conveniently receive and direct the hot charcoal when it exits downward through the rotated portal. These entrance and exit accessories can be manually operated or be automated, such as with motorized augers and drag-chain floors and hoppers with remotely controlled discharges.

The methods, systems, and apparatuses are set forth in part in the description which follows, and in part will be obvious from the description, or can be learned by practice of the methods, apparatuses, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed. More details concerning these embodiments, and others, are further described in the following figures and detailed description set forth herein below.

DETAILED DESCRIPTION OF THE INVENTION

The present invention is described in reference to the accompanying drawings and following embodiments that are presented for the purpose of illustration and should not be construed to limit the scope of the invention thereto.

Figure 1:
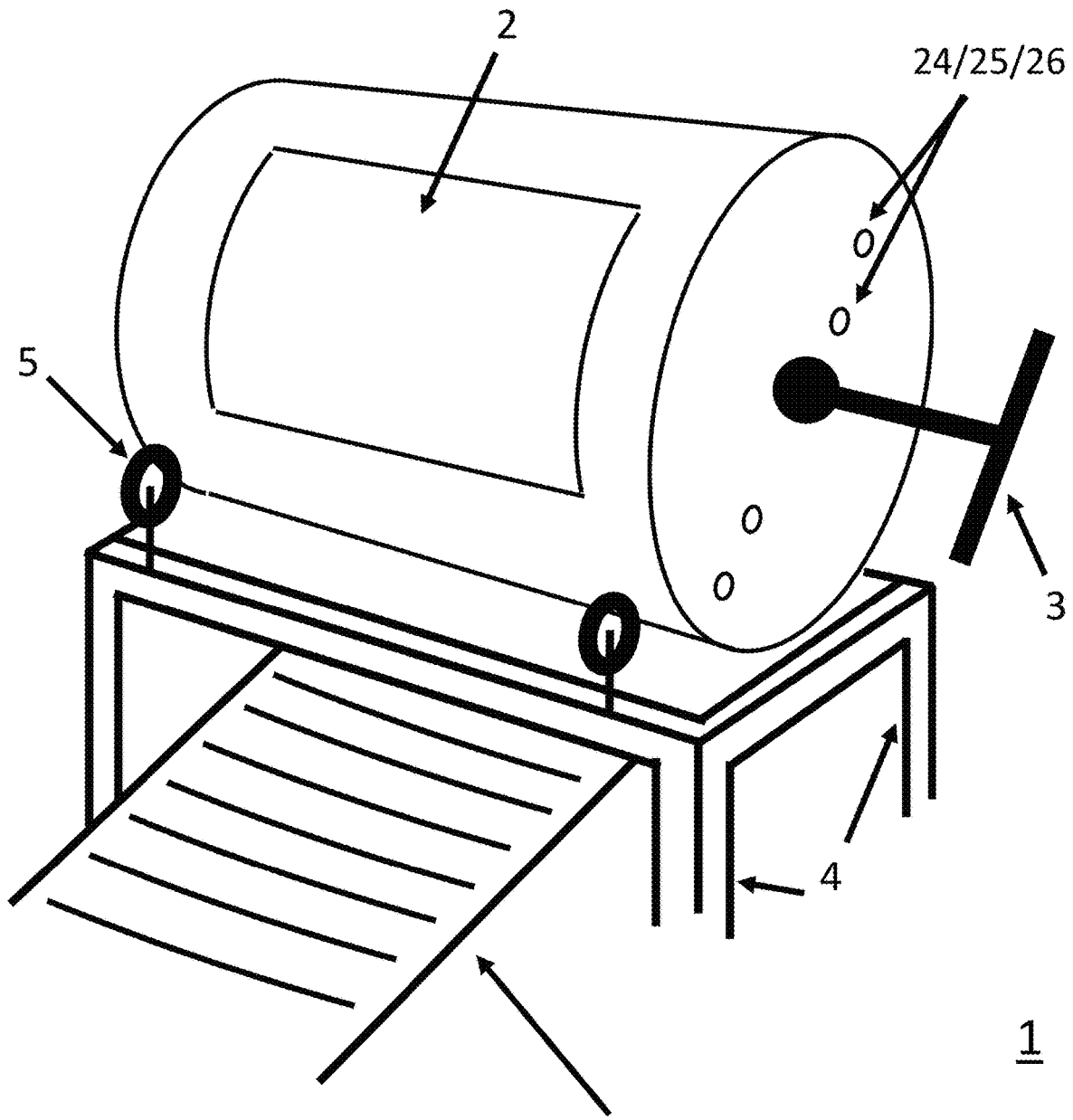
FIG. 1 illustrates a perspective view of a covered cavity kiln.
Figure 2:
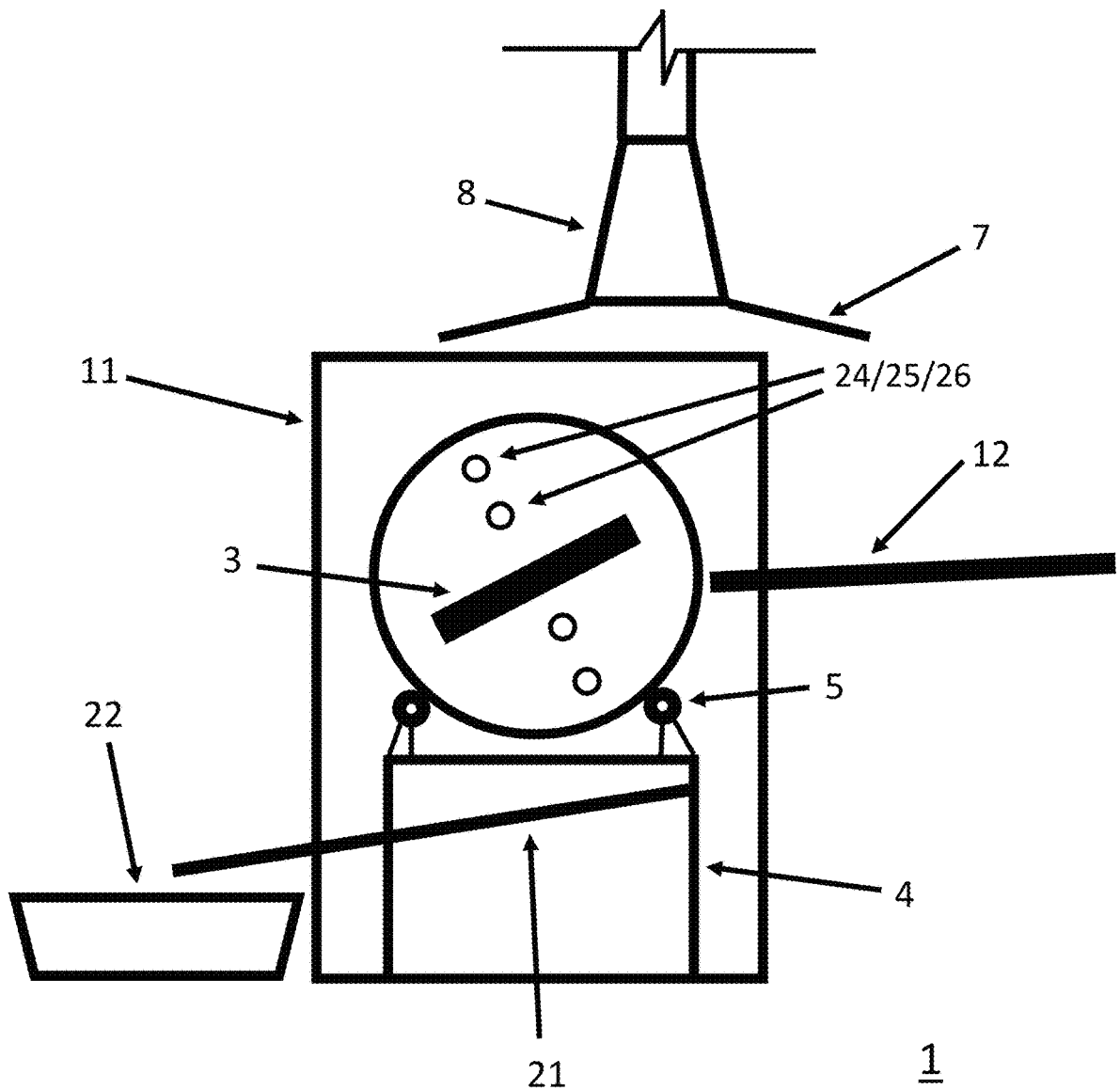
FIG. 2 illustrates a profile view of a functioning pyrolyzer of the invention.
Figure 3:
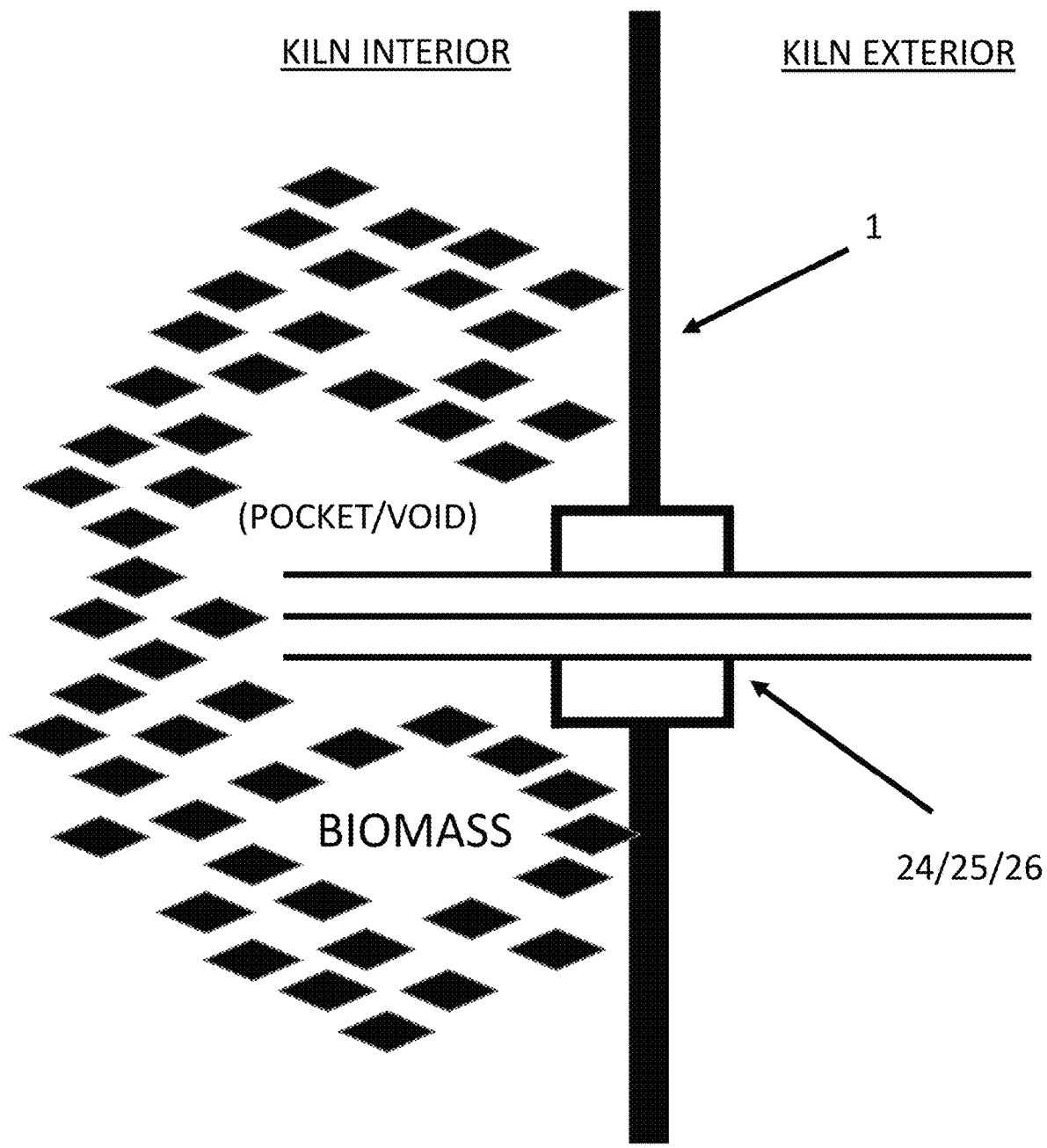
FIG. 3 is a cross-section illustrating pipes and sensors as inserted into the kiln of the invention.

One embodiment of the present invention, as shown in FIGS. 1-2, provides a covered cavity kiln pyrolyzer 1, comprising an enclosure having a first end surface and a second end surface joined by a continuous sidewall; the enclosure forming an interior area of the pyrolyzer in which entry of oxygen is regulated or prevented. Introduction of air is facilitated via at least one portal 2, such as a door, or regulated through a plurality of pipes 24.

The covered cavity kiln pyrolyzer 1 further comprises at least one portal 2 disposed along the continuous sidewall of the cylinder, spanning an axis thereof except for an area near each end of the at least one portal 2 to aid the structural strength of the pyrolyzer 1 The area near each end of the at least one portal 2 is further configured to engage a plurality of roller wheels 5, the plurality of roller wheels configured to make contact with and moveably couple the continuous sidewall. The at least one portal area may be divided into two or more segments, allowing for separation between an entry of air or fuel and an exit of emissions and flames. Some embodiments of the pyrolizer may further comprise a door that can cover some or all of the at least one portal opening, allowing for variable closure thereof.

The two or more segments may further comprise a plurality of separate holes specifically located and configured to match positions of a plurality of chimneys 8, the plurality of chimneys comprising one or more free-standing structures capable of covering an area relatively equal to an area formed by a portal of the pyrolizer.

The plurality of chimneys is further configured to redirect gases that are expelled from the pyrolizer during use. The plurality of chimneys may further comprise an attached hood structure 7, the hood structure comprising a metal sheet supported from above or to a side of the pyrolyzer by a frame 11. The frame of the hood structure may be coupled to, or wholly separate from the rack 4 upon which the cylinder of the pyrolyzer rests. The hood structure 7 may also be suspended from above or at an angle to collect expelled gases. The hood structure 7 may further comprise at least one pleated or curved surface, such as domed spaces or channels, the at least one pleated or curved surface configured to help reduce any impact from crosswinds and to further direct any flaming emissions and expelled gases to the plurality of chimneys.

The covered cavity kiln pyrolyzer 1 further comprises a cylindrical container with at least two closed ends, configured in a horizontal or inclined position. The plurality of roller wheels 5 of the covered cavity kiln pyrolyzer 1 may comprise a heat-resistant material, with the plurality of roller wheels 5 affixed to a rack 4 or support. The plurality of rollers are further configured to be an appropriate size for efficient, rotatable coupling of the covered cavity kiln pyrolyzer.

At at least one end of the covered cavity kiln pyrolyzer 1, a plurality of handles or mechanical couplings 3 is disposed, configured for manual rotation and stability of the kiln. The plurality of handles or mechanical couplings may be further configured to couple a mechanical means of rotation of the kiln.

Figure 5:
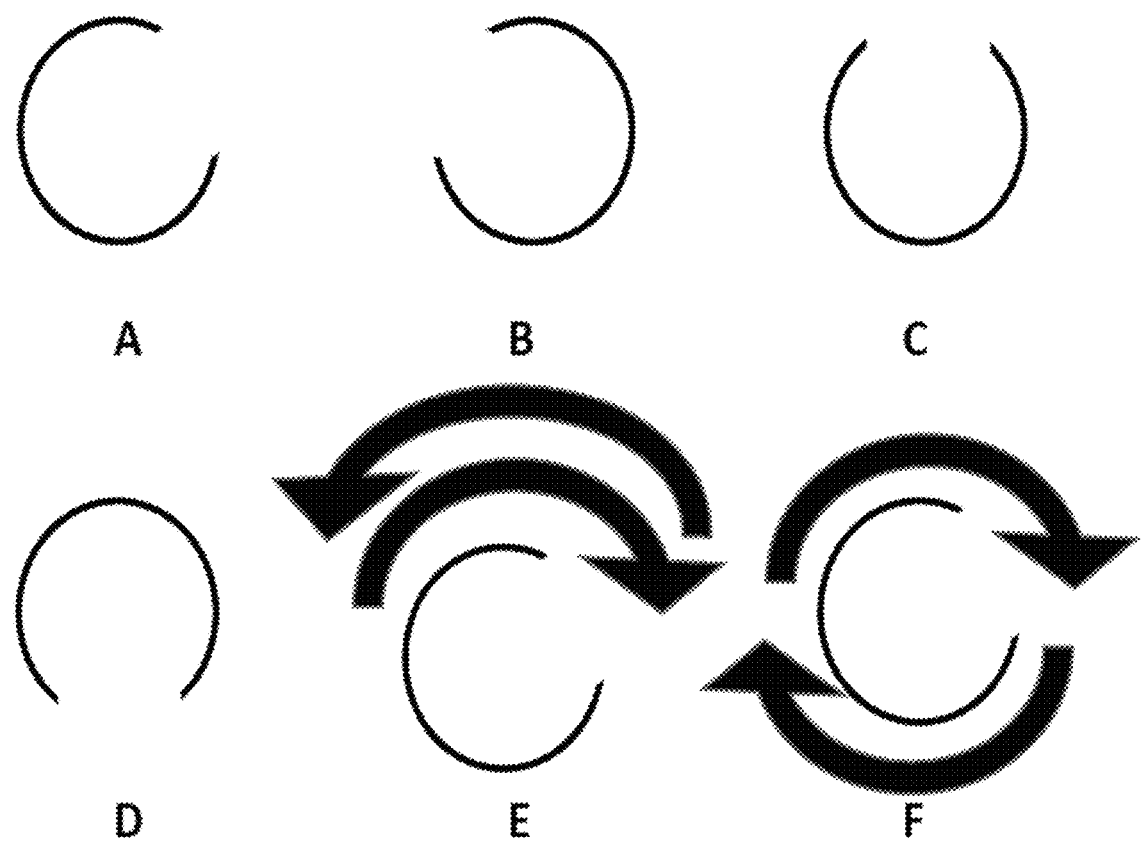
FIG. 5 illustrates the portal positions on a cylindrical covered cavity kiln.

The hood structure 7 may be configured to extend beyond an area defined by the pyrolyzer, allowing for channeling of heat to desired locations, such as for pre-drying of biomass that could be entering on a fuel feeder shelf 12, horizontal or inclined to feed biomass to the at least one portal, or above the hood structure for drying thereupon. The hood structure is further configured to be repositionable, allowing sliding and rotating about the kiln's central axis such that the hood structure covers the at least one portal when in the "straight-up position" as shown in FIG. 5, but allows the portal to remain uncovered when the invention is in the 'bulk-fuel-feeding' position, allowing unobstructed passage and access through the portal and into an interior of the pyrolyzer.

In some embodiments of the invention, hot emissions may be collected by the hood structure 7, and then subsequently directed into the plurality of chimneys 8 and can be further directed for various uses. Such directional control can be by natural draft or by forced draft of blowers, fans, or inducers.

In some embodiments of the invention, when the charcoal and any ash or brands are discharged downward, the pyrolyzer may further comprise an inclined surface 21 or a collection tray 22 disposed under the pyrolyzer to facilitate the collection of the output.

In some embodiments of the invention, one or more pipes 24, probes 25, or sensors 26 may be configured to enter the kiln via a plurality of openings, usually at one or more ends of the pyrolyzer 1. In some embodiments, the one or more pipes, probes, or sensors may be inserted via an end of the cylinder, while in other embodiments the one or more pipes, probes, or sensors may be inserted through the portal or a plurality of openings 2 disposed at an end of the enclosure. These can deliver accelerants or decelerants to alter the pyrolytic process inside the kiln, or they can deliver additives, such as solids and granular or powdered chemicals, for purposes such as the enhancement of the nutritional properties of the charcoal for plants and soil microbes. The pipes can be for natural or forced flows, all of which may be controlled and modulated by the operator or system.

In some embodiments of the invention, attached to the air pipes or on other pipes or bars 25, there may be prongs disposed thereupon that can be used for stirring the biomass by either rotation of the pipe/bar or by push-pull or any motion. These prongs are configured to facilitate mixing and creating pockets for air control. The prongs may also have different numbers and spacing configurations according to the biomass in the cylinder.

Figure 4A:
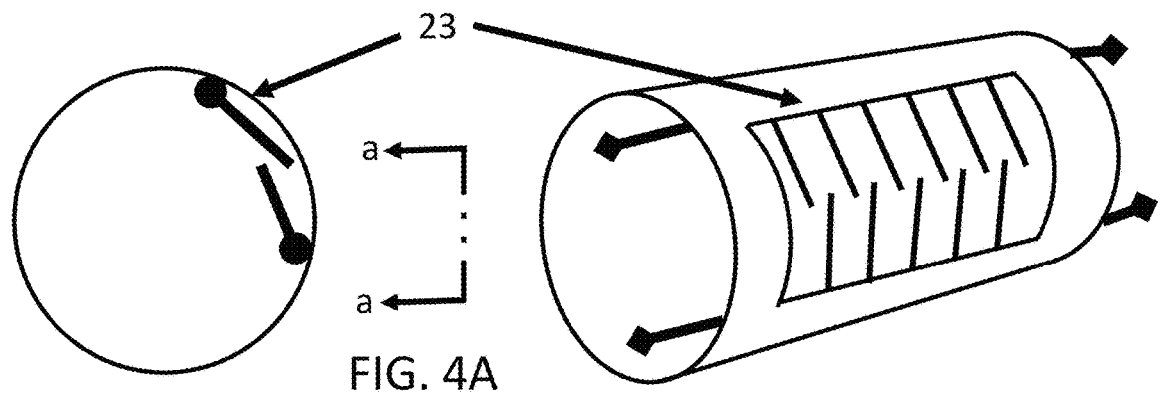
FIG. 4A illustrates a cross-section view of a configuration of prongs of an embodiment of the invention.
Figure 4B:
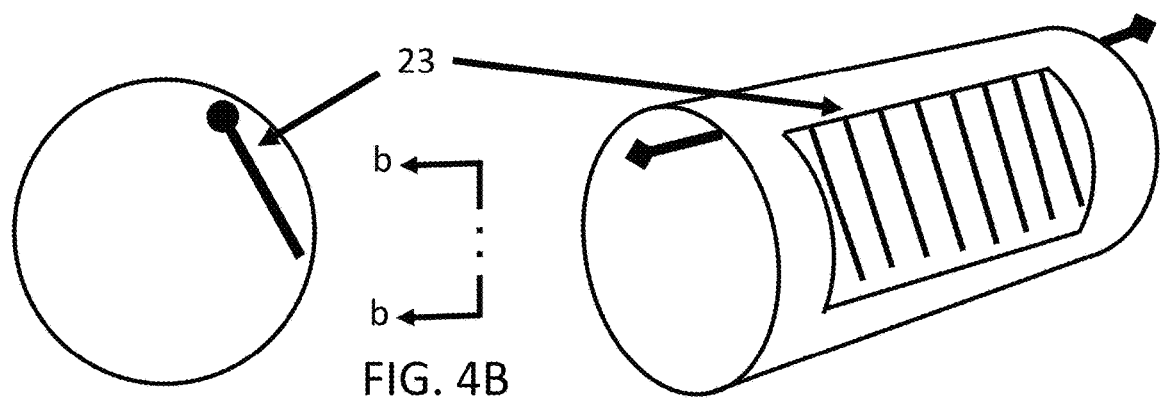
FIG. 4B illustrates a cross-section view of a configuration of prongs of an embodiment of the invention.
Figure 4C:
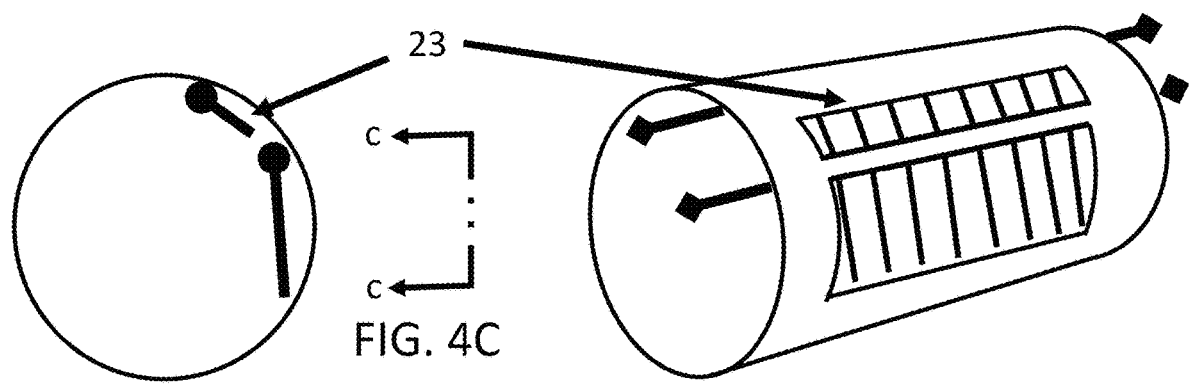
FIG. 4C illustrates a cross-section view of a configuration of prongs of an embodiment of the invention.
Figure 6:
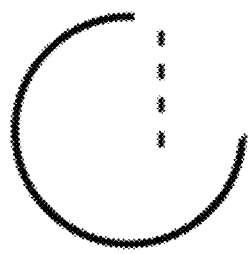
FIG. 6 illustrates prong positions at the portal when rotation is clockwise versus counterclockwise.
Figure 6:
Figure 6:
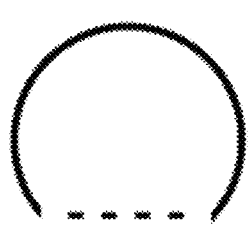
Figure 6:
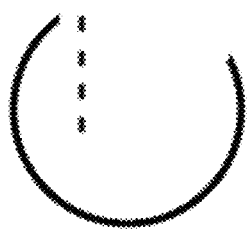
Figure 6:
Figure 6:

Pipes with securely attached prongs 23 may be configured, as shown in FIG. 6, with appropriate separations, within the interior of the pyrolyzer. The prongs may further be disposed along one or more edges of the at least one portal 2. The pipes are configured to allow rotational movement thereof, facilitated by one or more handles coupled to the outside of the cylinder. The pipes and securely attached prongs may further be configured to be locked into desired positions. The pipes may also be configured to allow the prongs to swing freely, as shown in FIG. 4, thereby becoming pressed into position by any charcoal or biomass that shifts upon them within the interior of the pyrolyzer. Depending on the biomass and rotation of the cylinder, the prongs are configured to lift or shift the biomass and charcoal when rotated clockwise, while also being positioned away from the at least one portal 2 when rotated counterclockwise, as shown in FIG. 6.

The prongs can further be affixed in positions, thereby forming a strainer-like structure configured to prevent sizeable pieces of biomass such as "brands" that are not yet fully pyrolyzed from falling out when the portal is facing downward. This essentially separates much of the charcoal from the not-yet pyrolyzed biomass. An advantage of this is that the retained brands can remain in the cylinder and then relocate to a bottom of pyrolyzer interior, where the retained brands can serve as a subsequent starter biomass when additional biomass is added for continual charcoal production. While a user is inserting fuel into the pyrolyzer, the prongs can be configured to freely swing or may be locked in a position that leaves the at least one portal fully open, allowing further modulation of oxygen exposure by the user. The prongs may further comprise hollow pipes to allow the dispersal of air or extinguishers such as water or inert gases to allow modulation of char production. The prongs may also comprise or contain sensors for operational monitoring of temperatures at or near the at least one portal throughout the production process.

The pyrolyzer may further comprise a non-cylindrical shape, such as a square-sided enclosure having affixed end plates that allow for attachment of a pivot point at a center of the end plates. The pyrolyzer may then be suspended from the pivot points, with sufficient clearance to allow outer edges of the enclosure to maintain clearance for full rotational movement.

The covered cavity kiln pyrolyzer may be further constructed inside of an appropriately sized building or container that could obviate the need for a rack or a frame or a hood structure. The individual components of the invention may derive structural support from other freestanding structures, as well as derive gas and heat collection or redirection from other freestanding systems designed for such collection or redirection.

The prongs may further comprise a grate or screen coupled to the at least one portal by an operator for facilitating screening or sifting processes. The grate or screen need not be coupled to the at least one portal throughout any rotational movements of the pyrolyzer. Additionally, in some embodiments, at least one door may be disposed over the at least one portal by an operator to enclose the kiln such as for rotation without char discharge or to maximize emissions for chemical recovery such as condensates. While the at least one door is disposed over the at least one portal, the pyrolyzer is not pressurized, having at least one exit for any expelled gases. During such operation, the pyrolyzer is configured to allow controlled entry of limited air into the interior of the pyrolyzer and throughout an enclosure biomass to provide sufficient flames to maintain desired pyrolytic temperatures. The at least one door is further configured to allow opening as needed for refueling and for discharge of generated charcoal.

The kiln may be either portable or configured to operate in fixed positions. In other embodiments, the kiln further comprises detachable wheels or skids configured to allow transportation of the kiln. The kiln may further be supported by an adjustable frame to allow inclination at various angles by raising or lowering one or more ends of the cylinder to cause any contents to shift toward one end. This movement would allow for additional shifting of the contents from one end toward another, especially if rotated while inclined. This allows a high degree of fuel feeding to be done near one end and most charcoal removal to be performed at the other end, including the possible charcoal removal through a plurality of openings in one or more ends of the kiln.

The pyrolyzer may also comprise one or more fuel delivery mechanisms coupled thereto and configured to facilitate transportation of biomass into an interior of the kiln. In some embodiments, a hopper containing fuel biomass may be suspended above the pyrolyzer and configured to dispense quantities of the fuel biomass into the pyrolyzer. Dispersion of the fuel biomass may be automated or initiated through operation by a user. In some embodiments, the pyrolyzer comprises a feeder shelf 12 is configured such that fuel entry and the dispensing or outflow of the charcoal may be automated or facilitated by a user.

The covered cavity kiln operates with the combustion of pyrolytic gases providing the heat to sustain the pyrolysis of the biomass in the pyrolyzer. Operator preferences and characteristics of some types of biomass could lead to different procedures as needed for the type or quantity of biomass.

The covered cavity kiln of the invention comprises six different designated positions of operation, as shown in FIGS. 5A-F. Each position of operation may be identified by a radial position of the portal about a central axis of the cylinder, expressed in degrees on a circle, increasing clockwise for 0 and 360 degrees at the top position. The at least one portal in this example is 80 degrees of arch. The degrees are with some approximation and need not be measured or determined with accuracy on the kiln, as they are merely reference points for the positions of operation.

| Portal Position | Position Name | Purpose | Observations |
|---|---|---|---|
| 5A 10 to 90 | Shelf fuel feeding | Slide in fuel on shelf | "Normal" position; best flame cap. |
| 5B 270 to 350 | Bulk fuel feeding | Drop in fuel | Short time only; lacks draft. |
| 5C 320 to 40 | Straight up | Slow the fire | Least air entry; "simmer". |
| 5D 140 to 220 | Straight down | Unloading | Used sparingly. |
| 5E Roll 240 | Rocking back and forth | Tumble w/o dumping | Use common sense; varies w/fuel type. |
| 5F Roll 360+ | Full rotation | Mixing extensively | Subject to conditional limitations. |

When the kiln and the fuel are all cold, the kiln is positioned in the bulk fuel feeding position 5B. Then, a modest layer of cold charcoal is added as fuel into the kiln to minimize any failure of pyrolysis to reach the lowest levels that are touching the cold steel. Feedstock is added next, the feedstock configured to ignite an even fire across the entire bed of the kiln. The fire is then ignited and established with placement of additional fuel.

Next, a user initiates slow rotation of the kiln until the kiln is in the "normal" or shelf fuel feeding position of operation 5A. Fuel is then added as needed. This method of operation allows faster and larger quantities of char production than with typical open-top flame-cap (open cavity) kilns due to a user of the current invention retaining the ability to mix the contents to attain complete pyrolysis.

When an accumulated biomass and charcoal has amassed within the lower portion of the kiln and has not fully pyrolyzed, the cylinder is then rotated back and forth between 5E on the support wheels or central axis of the pyrolyzer, causing the biomass to shift position and expose the non-pyrolyzed material to heat for pyrolysis. Rotation will also break apart the pieces of charcoal. Movement of the prongs, flights, lifters and pipes can also assist to expose any non-pyrolyzed material to the heat. Varied and modulated movement and fuel additions continue until a lower half of the kiln is full of charcoal.

When the prongs are positioned to extend across the at least one portal, this allows char to be removed through the gaps while securing inside the container most of the biomass that has not yet been completely pyrolyzed. In this situation, the cylinder can be rotated fully and continuously or with rotations in opposite directions, with exit of charcoal when in the straight down position, facilitated by the prongs.

To continue making charcoal, a small amount of hot char is retained (and any biomass that is still pyrolyzing, perhaps intentionally added a few minutes before extracting the charcoal) to avoid needing the sensitive ignition stage previously discussed. Rotating the pyrolyzer back to either of the two positions for loading in more fuel and then continuing to the normal position 5A.

To completely empty the pyrolyzer, the prongs are positioned away from closing the at least one portal so that the contents can be totally emptied downward by gravity. To reduce the occurrence of rusting, do not wash the covered cavity kiln.

Those of ordinary skill in the art will understand and appreciate that the foregoing description of the invention has been made with reference to certain exemplary embodiments of the invention, which describe a covered cavity kiln pyrolyzer. Those of skill in the art will understand that obvious variations in system configuration, protocols, parameters or properties may be made without departing from the scope of the invention which is intended to be limited only by the claims appended hereto.

What is claimed is:

1. A covered, rotatable cavity kiln pyrolyzer, comprising:
    a. An enclosure, having a first end, a second end, and at least one continuous sidewall, the continuous sidewall having a central axis and forming an interior cavity, wherein the enclosure is capable of structurally withstanding combustion of gases and prolonged fire and heat exposure;
    b. a frame member, configured to engage the enclosure;
    c. a handle disposed on at least one end of the enclosure, configured to allow handling, manipulation, and modulation of the enclosure during use;
    d. a hood structure positioned above the frame member and configured to collect and redirect emissions, wherein the hood structure is unconnected to the frame member and the enclosure, wherein the hood structure comprises a pleated or a curved surface configured to help reduce any impact from crosswinds and to further direct flaming emissions and expelled gases to a chimney;
    e. a plurality of openings disposed in at least one end of the enclosure, configured to accept one or more sensors or probe or accelerant or decelerant;
    f. at least one portal, having at least one edge, disposed through the at least one continuous sidewall of the enclosure; and
    g. a prong moveably coupled to an edge of the at least one portal, the prong is configured to allow selective discharge of contents of the pyrolyzer through the at least one portal.

2. The pyrolyzer of claim 1, further having a plurality of roller wheels at the first end and the second end of the enclosure, configured to engage and moveably couple the enclosure and allow rotation of the enclosure about the central axis thereof.

3. The pyrolyzer of claim 2, wherein the enclosure has a plurality of operational positions defined by rotational position of the enclosure about the central axis thereof.

4. The pyrolyzer of claim 3, wherein the frame member is configured to moveably engage the enclosure.

5. The pyrolyzer of claim 4, wherein the hood structure is functionally moveable about the enclosure, further configured to allow user modulation and manipulation of collected and redirected gases expelled from the enclosure.

6. The pyrolyzer of claim 5, wherein gases collected and redirected by the hood structure are utilized by a user to facilitate continued pyrolysis of biomass through reincorporation or re-injection of the collected gases into the enclosure.

7. The pyrolyzer of claim 5, wherein the at least one portal further comprises a door member configured to open and close over the portal, creating a non-pressurized seal within the enclosure.

8. The pyrolyzer of claim 7, wherein the prong is further configured to modulate a rate of discharge of processed char, the rate of discharge dependent upon rotational position and movement of the enclosure about a central axis thereof.

9. The pyrolyzer of claim 7, wherein the prong is further configured to facilitate mixing of biomass within the enclosure, the mixing dependent upon rotational position and movement of the enclosure about a central axis thereof.

10. The pyrolyzer of claim 9, wherein the prong is configured to facilitate mixing through direct physical manipulation of the prong by a user.

11. The pyrolyzer of claim 10, further comprising a probe configured for insertion into the interior cavity.

12. The pyrolyzyer of claim 11, wherein the probe is configured to deliver air to the interior cavity.

13. The pyrolyzyer of claim 11, wherein the probe is configured to deliver extinguishing material to the interior cavity.

14. The pyrolyzyer of claim 11, wherein the probe is configured to monitor a condition of the interior cavity.

15. The pyrolyzer of claim 10, wherein pyrolyzed char is periodically removed from the interior cavity and new biomass is periodically added.

16. The pyrolyzer of claim 10, further comprising at least one fuel feeder shelf configured to transport biomass into the enclosure, with activation of the delivery mechanism capable of modulation by a user.

17. The pyrolyzer of claim 16, wherein the at least one fuel feeder shelf is configured to activate and transport biomass into the enclosure automatically.

\* \* \* \* \*